United States Patent
Xie et al.

(10) Patent No.: US 8,210,976 B2
(45) Date of Patent: Jul. 3, 2012

(54) CONTROL SYSTEM FOR AN AUTOMATIC TRANSMISSION HAVING MULTIPLE DEFAULT MODES

(75) Inventors: Zhe Xie, Auburn Hills, MI (US); Bret M. Olson, Whitelake, MI (US); Robert L. Moses, Ann Arbor, MI (US); Vijay A. Neelakantan, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 472 days.

(21) Appl. No.: 12/491,291

(22) Filed: Jun. 25, 2009

(65) Prior Publication Data

US 2010/0326542 A1 Dec. 30, 2010

(51) Int. Cl.
*F16H 31/00* (2006.01)
*F16H 61/38* (2006.01)
*F16H 61/40* (2010.01)
*F16H 61/26* (2006.01)

(52) U.S. Cl. ........ 475/116; 475/118; 475/120; 475/121; 475/122; 475/127; 475/128; 477/52; 477/68; 477/69; 477/156; 477/164

(58) Field of Classification Search .......... 475/116–128; 477/52, 68, 69, 156–164
See application file for complete search history.

(56) References Cited

U.S. PATENT DOCUMENTS

| | | | | |
|---|---|---|---|---|
| 5,445,043 | A * | 8/1995 | Eaton et al. | 74/335 |
| 5,919,108 | A * | 7/1999 | Takagi | 475/127 |
| 6,292,731 | B1 * | 9/2001 | Kirchhoffer et al. | 701/55 |
| 6,523,636 | B2 * | 2/2003 | Chatterjea | 180/333 |

* cited by examiner

*Primary Examiner* — Tisha Lewis

(57) ABSTRACT

A hydraulic control system for a automatic transmission includes a plurality of solenoids and valves in fluid communication with a plurality of shift actuators. The shift actuators are operable to actuate a plurality of torque transmitting devices. Selective activation of combinations of the solenoids allows for a pressurized fluid to activate at least one of the shift actuators. The solenoids are configured to provide a forward gear ratio and a reverse gear ratio when the solenoids are deenergized.

21 Claims, 8 Drawing Sheets

# US 8,210,976 B2

CONTROL SYSTEM FOR AN AUTOMATIC TRANSMISSION HAVING MULTIPLE DEFAULT MODES

TECHNICAL FIELD

The disclosure relates to a control system for an automatic transmission, and more particularly to an electro-hydraulic control system having a plurality of solenoids and valves and having multiple default modes.

BACKGROUND

A typical transmission uses a combination of selectively engageable clutches and brakes to achieve a plurality of forward and reverse gear ratios. Typically an electronically controlled hydraulic control circuit or system is employed to control solenoids and valve assemblies. The solenoids and the valve assemblies are configured to selectively communicate a pressurized hydraulic fluid to actuate the clutches and brakes.

While conventional hydraulic control systems are useful for their intended purpose, the need for new and improved hydraulic control system configurations within transmissions which exhibit improved performance, especially from the standpoints of efficiency, responsiveness and smoothness, is essentially constant. In addition, it is desirable to have hydraulic control systems that have multiple default modes that allow at least limited operability of the transmission in the event of electrical or other failures of the control system. Accordingly, there is a need for an improved, cost-effective hydraulic control system for use in a transmission that includes operable default modes.

SUMMARY

A hydraulic control system for actuating a plurality of torque transmitting devices in a transmission includes a pump for providing a hydraulic fluid, first, second, third, fourth, fifth, and sixth actuators for selectively actuating the plurality of torque transmitting devices, and first, second, third, and fourth control devices operable to selectively communicate the hydraulic fluid through the first, second, third, and fourth control devices. The first control device is in communication with the pump, the second control device is in communication with the third actuator, the third control device is in communication with the fourth actuator, and the fourth control device is in communication with the sixth actuator. A first valve is in communication with the pump and with the second, third, and fourth control devices. The first valve is moveable between a drive position and a reverse position. A second valve is in communication with the first valve, the first control device, the first actuator, the second actuator, and the third actuator. The second valve is moveable between a first position and a second position. The first valve allows communication between the pump and the second, third, and fourth control devices when the first valve is in the drive position and the first valve allows communication between the pump and the first and fourth control devices and the second valve when the first valve is in the reverse position. The second valve allows communication between the first control device and the first actuator when the second valve is in the first position and the second valve allows communication between the first control device and the second and third actuators when the second valve is in the second position. The first and fourth control devices are configured to allow hydraulic fluid to pass through the first and fourth control devices to engage at least one forward gear state and a reverse gear state when the first and fourth control devices are not activated.

In one example of the hydraulic control system of the present disclosure, the sixth actuator is operable in combination with at least one of the first, second, and third actuators to engage a forward speed ratio and a reverse speed ratio.

In another example of the hydraulic control system of the present disclosure, the sixth actuator and the first actuator are engageable, in combination, to provide a forward gear ratio and the sixth actuator and the second and third actuators are engageable, in combination, to provide a reverse gear ratio.

In yet another example of the hydraulic control system of the present disclosure, the hydraulic fluid communicated from the first valve to the second valve when the first valve is in the Reverse position moves the second valve to the second position.

In yet another example of the hydraulic control system of the present disclosure, a fifth control device is in communication with the pump and with the second valve, wherein the fifth control device is operable to allow hydraulic fluid to communicate through the fifth control device to the second valve when the fifth control device is not activated, and wherein the hydraulic fluid from the fifth control device contacts the second valve and moves the second valve to the first position.

In yet another example of the hydraulic control system of the present disclosure, the second valve includes a first port located at one end of the second valve and includes a second port located at an opposite end of the second valve and wherein the first port communicates with the first valve and the second port communicates with the fifth control device.

In yet another example of the hydraulic control system of the present disclosure, the hydraulic fluid from the first valve contacts the second valve and moves the second valve to the second position when the first valve is in the Reverse position.

In yet another example of the hydraulic control system of the present disclosure, the fifth control device is a solenoid that allows the hydraulic fluid to communicate from the pump to the second valve when the solenoid is deenergized.

In yet another example of the hydraulic control system of the present disclosure, the fifth control device is a solenoid that prevents the hydraulic fluid to communicate from the pump to the second valve when the solenoid is deenergized.

In yet another example of the hydraulic control system of the present disclosure, a fifth control device is in communication with the pump and with the second valve, wherein the fifth control device is operable to allow hydraulic fluid to communicate through the fifth control device to the second valve when the fifth control device is activated, and wherein the hydraulic fluid from the fifth control device contacts the second valve and moves the second valve to the second position.

In yet another example of the hydraulic control system of the present disclosure, the second valve is a two piece valve having a first valve part and a second valve part, and the manual valve communicates with the second valve at an end of the second part and the fifth control device communicates with the second valve between the first valve part and the second valve part.

In yet another example of the hydraulic control system of the present disclosure, the second valve includes a biasing member in contact with the first valve part, the biasing member operable to bias the first valve part to the first position.

In yet another example of the hydraulic control system of the present disclosure, the hydraulic fluid from the first valve contacts the second valve part and moves the first valve part to the second position when the first valve is in the reverse position.

In yet another example of the hydraulic control system of the present disclosure, the first valve is actuated to the first position by a first solenoid and is actuated to the second position by a second solenoid.

In yet another example of the hydraulic control system of the present disclosure, a park release servo is in communication with the first valve and is operable to place the transmission in an out-of-park mode of operation.

In yet another example of the hydraulic control system of the present disclosure, the first and fourth control devices are solenoids that are open when deenergized and the second and third control devices are solenoids that are closed when deenergized.

Further objects, aspects and advantages of the present disclosure will become apparent by reference to the following description and appended drawings wherein like reference numbers refer to the same component, element or feature.

BRIEF DESCRIPTION OF THE DRAWINGS

The drawings described herein are for illustration purposes only and are not intended to limit the scope of the present disclosure in any way.

DESCRIPTION

Figure 1:
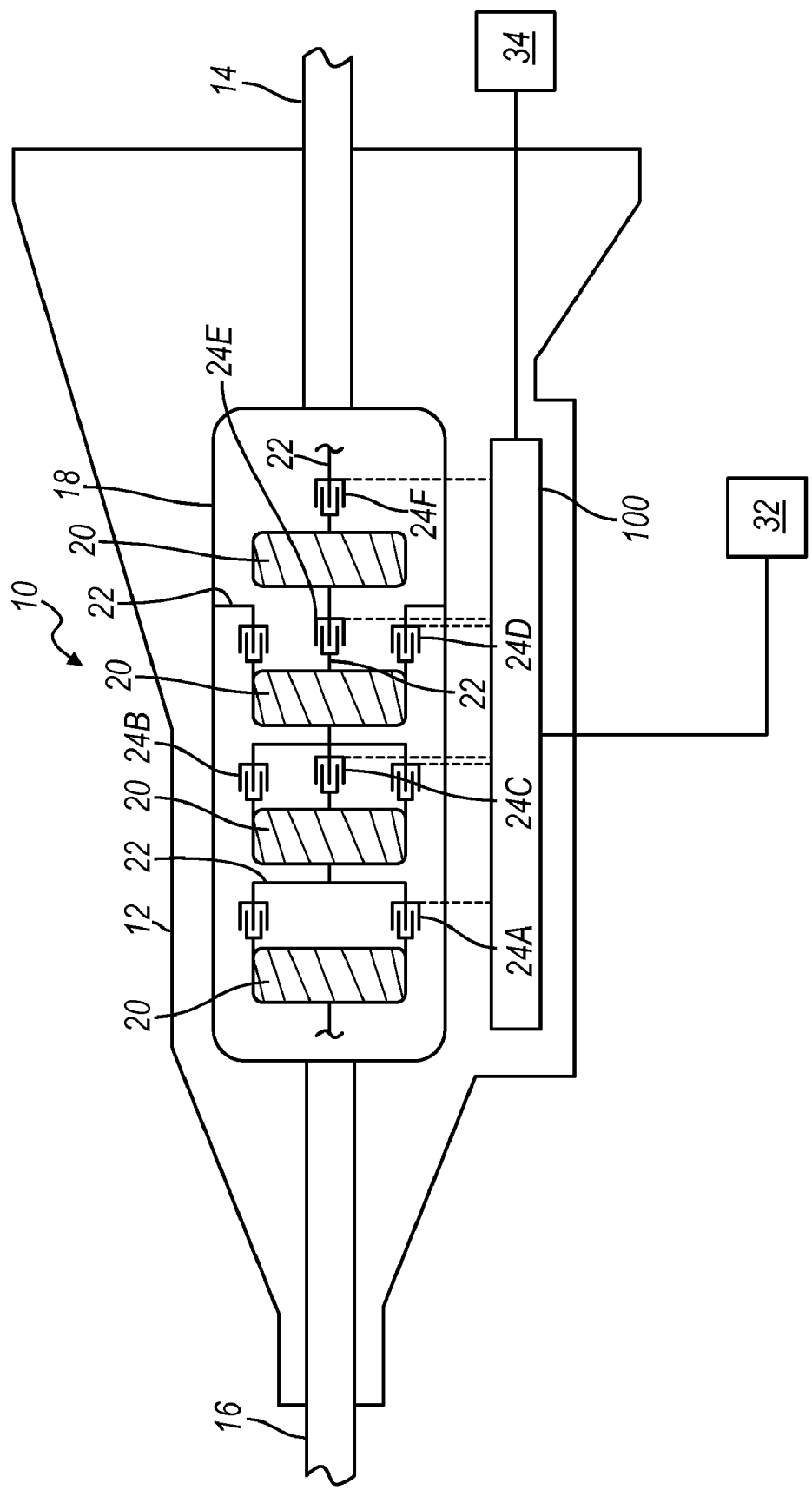
FIG. 1 is a schematic diagram of an exemplary automatic transmission according to the principles of the present disclosure.

With reference to FIG. 1, an exemplary automatic transmission incorporating a hydraulic control system according to the present disclosure is illustrated and generally designated by the reference number 10. The transmission 10 includes a typically cast, metal housing 12 which encloses and protects the various components of the transmission 10. The housing 12 includes a variety of apertures, passageways, shoulders and flanges which position and support these components. The transmission 10 includes an input shaft 14, an output shaft 16, and a gear and clutch arrangement 18. It should be appreciated that while the transmission 10 is illustrated as a rear wheel drive transmission, the transmission 10 may have other configurations without departing from the scope of the present disclosure. The input shaft 14 is connected with a prime mover (not shown) such as an internal combustion gas or Diesel engine or a hybrid power plant. The input shaft 14 receives input torque or power from the prime mover. The output shaft 16 is preferably connected with a final drive unit (not shown) which may include, for example, propshafts, differential assemblies, and drive axles. The input shaft 14 is coupled to and provides drive torque to the gear and clutch arrangement 18.

In the example provided, the gear and clutch arrangement 18 includes a plurality of gear sets, indicated generally by reference number 20, and a plurality of shafts, indicated generally by reference number 22. The plurality of gear sets 20 includes individual intermeshing gears, such as planetary gear sets, that are connected to or selectively connectable to the plurality of shafts 22. The plurality of shafts 22 may include layshafts, countershafts, sleeve and center shafts, reverse or idle shafts, or combinations thereof. It should be appreciated that the specific arrangement and number of the gear sets 20 and the specific arrangement and number of the shafts 22 within the transmission 10 may vary without departing from the scope of the present disclosure.

The gear and clutch arrangement 20 further includes a plurality of torque transmitting mechanisms including a first torque transmitting mechanism 24A, a second torque transmitting mechanism 24B, a third torque transmitting mechanism 24C, a fourth torque transmitting mechanism 24D, a fifth torque transmitting mechanism 24E, and a sixth torque transmitting mechanism 24F. The torque transmitting mechanisms 24A-F are operable to selectively couple individual gears within the plurality of gear sets 20 to the plurality of shafts 22 and/or to the housing 12. Accordingly, the torque transmitting mechanisms 24A-F may be any combination of clutches or brakes of various kinds including wet clutches, rotating clutches, etc. In the example provided, the transmission 10 is operable to produce at least six forward speed ratios and one reverse ratio by selectively activating at least two of the torque transmitting mechanisms 24A-F at a time in combination.

The transmission 10 also includes a transmission control module 32. The transmission control module 32 is preferably an electronic control device having a preprogrammed digital computer or processor, control logic, memory used to store data, and at least one I/O peripheral. The control logic includes a plurality of logic routines for monitoring, manipulating, and generating data. The transmission control module 32 controls the actuation of shift actuators via a hydraulic control system 100 according to the principles of the present disclosure. Finally, the transmission includes a range selector 34 located external to the transmission 10 for selecting one of a drive, neutral, reverse, or park mode of operation. In the example provided, the range selector 34 communicates directly with the hydraulic control system 100, however, in an electronic transmission range selection (ETRS) system the range selector 34 may communicate directly with the controller 32 without departing from the scope of the present disclosure.

Figure 2:
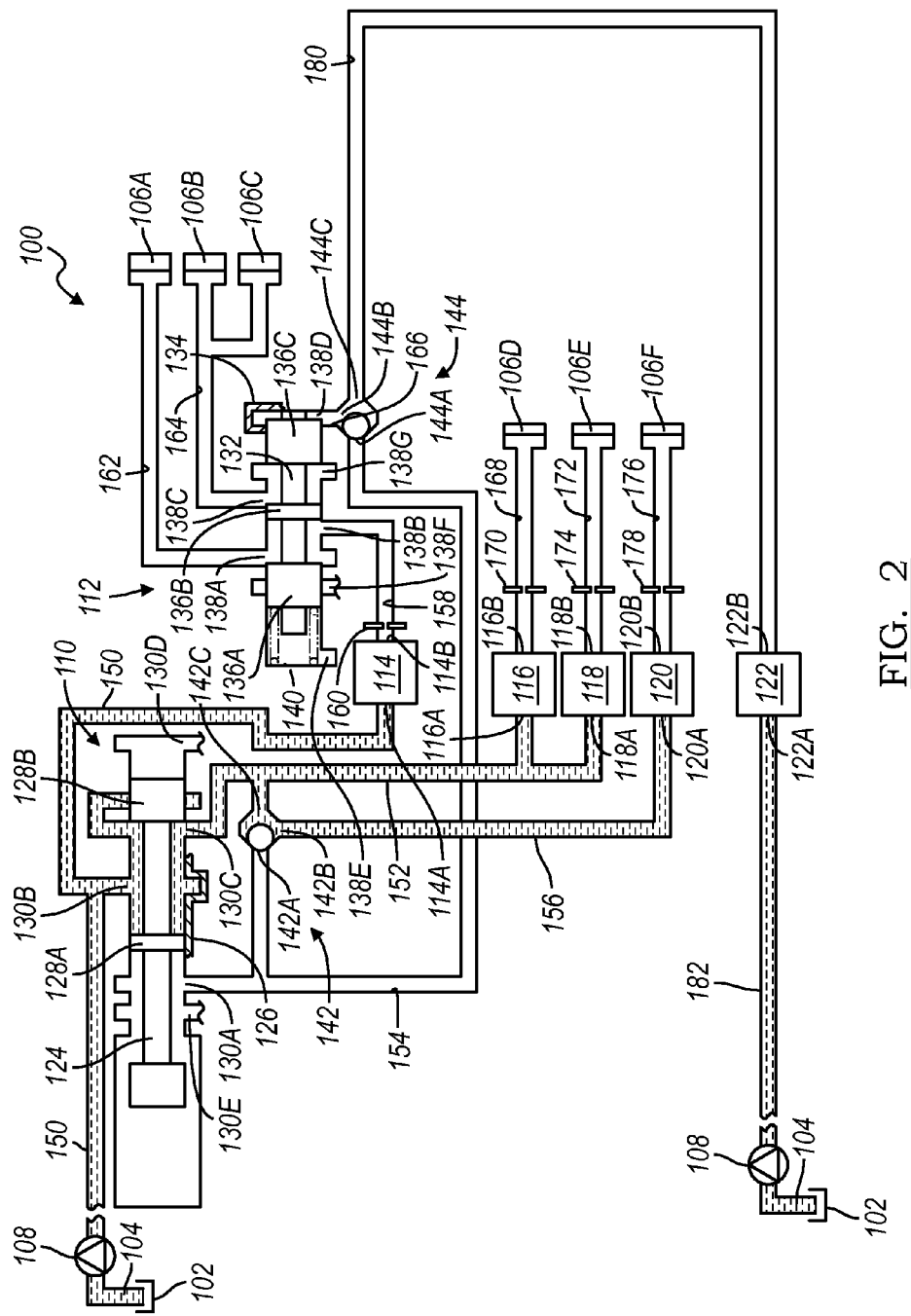
FIG. 2 is a schematic diagram of an embodiment of a hydraulic control system in a first mode or normal Drive mode of operation according to the principles of the present disclosure.

Turning to FIG. 2, the hydraulic control system 100 of the present disclosure is illustrated in greater detail. It should be appreciated that an actuator subsystem is specifically illustrated and that the hydraulic control system 100 may have various other subsystems, including a line pressure control subsystem, a cooling subsystem, etc., without departing from the scope of the present disclosure. The hydraulic control system 100 is operable to selectively engage the torque transmitting devices 24A-F by selectively communicating a hydraulic fluid 102 from a sump 104 to a plurality of shift actuators 106A, 106B, 106C, 106D, 106E, and 106F, as will be described in greater detail below.

The sump 104 is a tank or reservoir preferably disposed at the bottom of the transmission housing 12 to which the hydraulic fluid 104 returns and collects from various components and regions of the automatic transmission 10. The hydraulic fluid 102 is forced from the sump 104 and communicated throughout the hydraulic control system 100 via a pump 108. The pump 108 may be driven or powered by any prime mover, such as an internal combustion engine or an electric engine (not shown), and may be, for example, a gear pump, a vane pump, a gerotor pump, or any other positive displacement pump. The shift actuators 106A-F are preferably hydraulically actuated piston assemblies that each mechanically engage one of the torque transmitting devices 24A-F, respectively, upon receipt of pressurized hydraulic fluid 104 delivered by the pump 108. However, it should be appreciated that the shift actuators 106A-F may take other forms without departing from the scope of the present disclosure. In the example provided, a reverse gear state is engaged when the shift actuators 106B, 106C and 106F receive pressurized hydraulic fluid 104. A first gear state is engaged when shift actuators 106B, 106C, and 106E receive pressurized hydraulic fluid 104. A second gear state is engaged when shift actuators 106D and 106E receive pressurized hydraulic fluid 104. A third gear state is engage when shift actuators 106E and 106F receive pressurized hydraulic fluid 104. A fourth gear state is engage when shift actuators 106A and 106E receive pressurized hydraulic fluid 104. A fifth gear state is engage when shift actuators 106A and 106F receive pressurized hydraulic fluid 104. A sixth gear state is engage when shift actuators 106A and 106D receive pressurized hydraulic fluid 104.

The hydraulic control system 100 includes a manual valve 110, a mode valve 112, and a plurality of solenoids 114, 116, 118, 120, and 122 that cooperate to selectively communicate the pressurized hydraulic fluid 104 to a combination of the shift actuators 106A-F in order to engage desired forward or reverse gear ratios. The manual valve 110, the mode valve 112, and the plurality of solenoids 114, 116, 118, 120, and 122 are specifically configured to insure that pressurized hydraulic fluid 104 is delivered to a combination of the shift actuators 106A-F in order to enable the transmission 10 to provide at least one forward gear and the reverse gear in the event of a failure of one or more of the solenoids 114, 116, 118, 120, and 122 or other electrical systems within the transmission 10, as will be described in greater detail below.

The manual valve 110 generally includes a valve 124 slidably disposed in a valve body 126. The valve 124 is a spool valve having a plurality of lands 128A and 128B. A plurality of ports are disposed in the valve body 126 and communicate with the valve 124. For example, the manual valve 110 includes port 130A, port 130B, port 130C, port 130D, and port 130E. Ports 130D and 130E are exhaust ports that communicate with the sump 102. It should be appreciated that the manual valve 110 may have various other ports and configurations without departing from the scope of the present disclosure.

Figure 3:
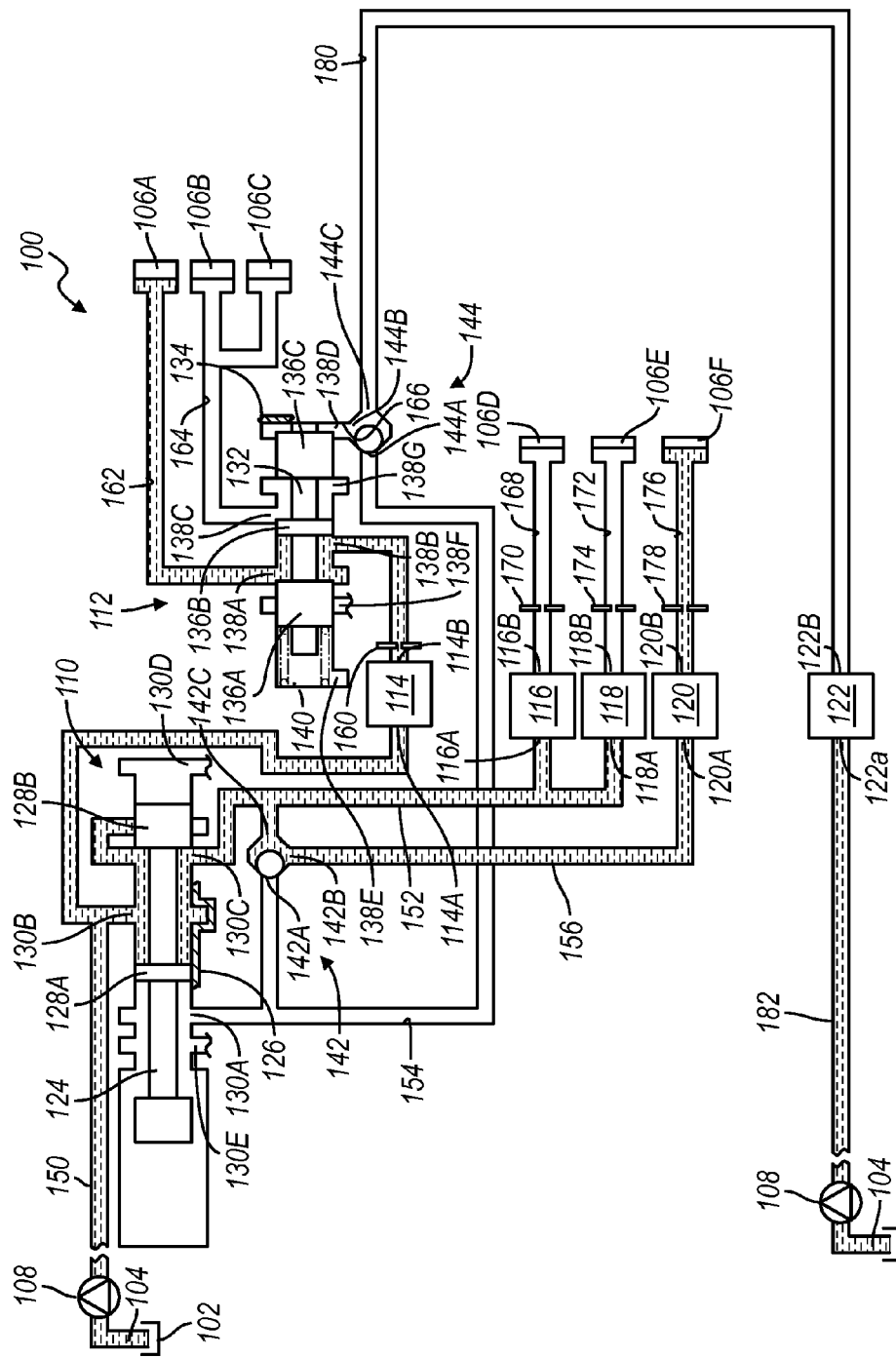
FIG. 3 is a schematic diagram of the hydraulic control system in a second mode or failure Drive mode of operation according to the principles of the present disclosure.
Figure 4:
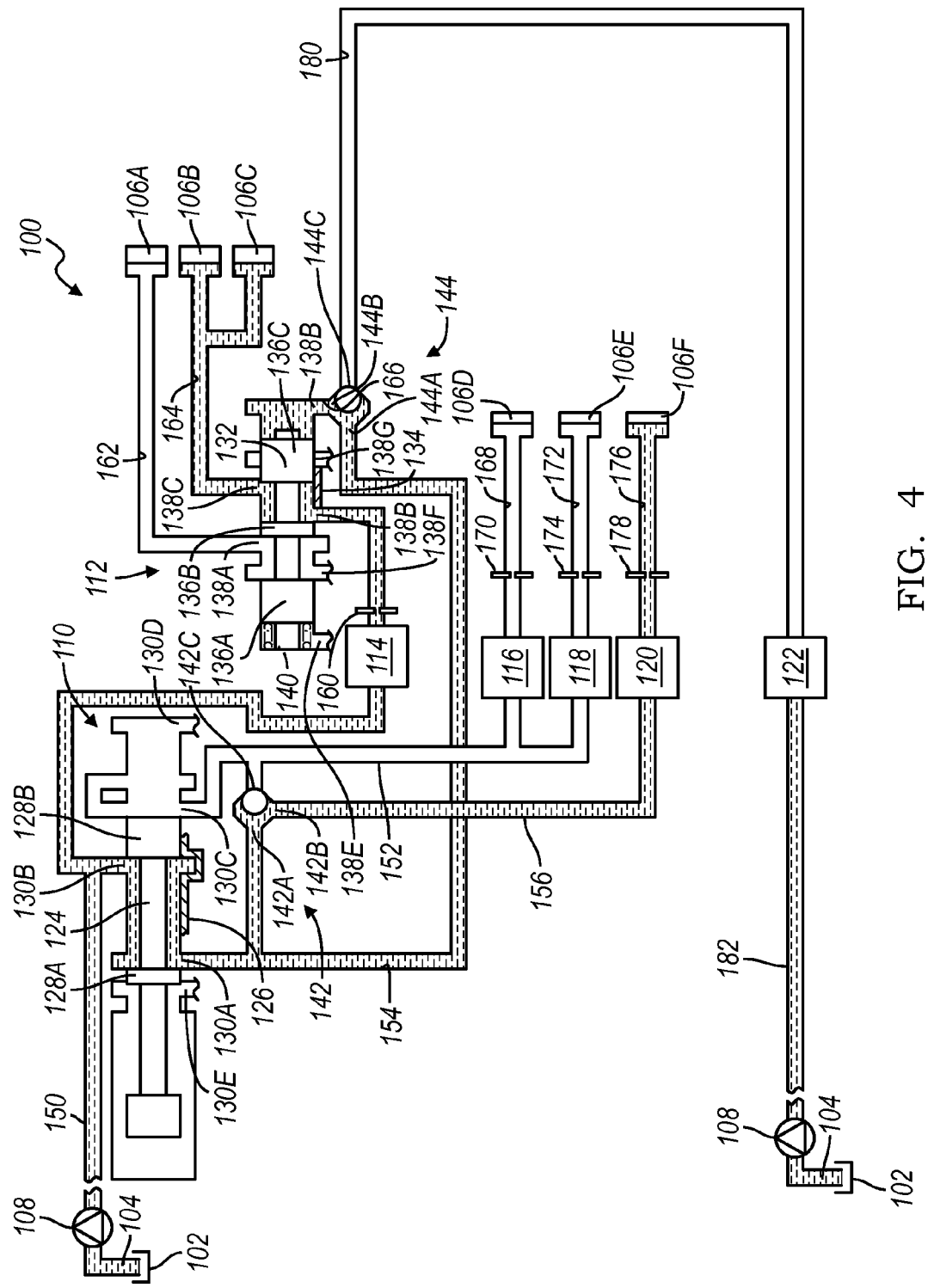
FIG. 4 is a schematic diagram of the hydraulic control system in a third mode or failure Reverse mode of operation according to the principles of the present disclosure.

The valve 124 is moveable between a plurality of positions that correspond to Park, Drive, Neutral, and Reverse, each indicative of a desired mode of operation. For example, a first position or Drive position is shown in FIGS. 2 and 3 and a second position or Reverse position is shown in FIG. 4. When the valve 124 is in the Drive position, port 130B communicates with port 130C and land 128A prevents port 130B from communicating with port 130A while land 128B prevents port 130B from communicating with port 130D. When the valve 124 is in the reverse position, as illustrated in FIG. 4, port 130B is in communication with port 130A and land 128B prevents port 130B from communicating with port 130C. While not specifically illustrated, when the valve 124 is in the Neutral position the valve 124 prevents port 130B from communicating with ports 130A and 130C and when the valve 124 is in the Park position the valve 124 allows communication of port 130A with port 130E and allows communication of port 130C with port 130D in order to exhaust hydraulic fluid 104 from the system. The valve 124 is actuated by a manual shift selector (not shown) that mechanically moves the valve 124 between the plurality of positions.

The mode valve 112 includes a valve 132 slidably disposed in a valve body 134. The valve 132 is a spool valve having a plurality of lands 136A, 136B, and 136C. A plurality of ports are disposed in the valve body 134 and communicate with the valve 132. For example, the mode valve 112 includes port 138A, port 138B, port 138C, port 138D, port 138E, port 138F, and port 138G. Ports 138E-G are exhaust ports that communicate with the sump 102. It should be appreciated that the mode valve 112 may have various other ports and configurations without departing from the scope of the present disclosure.

The valve 132 is moveable between a plurality of positions including a first position, shown in FIGS. 2 and 3 and a second position shown in FIG. 4. When the valve 132 is in the first position, land 136A prevents port 138A from communicating with port 138F, port 138B communicates with port 130A, land 136B prevents port 138B from communicating with port 138C, and port 138C communicates with port 138G. When the valve 132 is in the second position, port 138A communicates with port 130F, land 136B prevents port 138B from communicating with port 138A, port 138B communicates with port 138C, and land 136C prevents port 138C from communicating with port 138G. The valve 132 is actuated to the second position by hydraulic fluid 104 supplied to port 138D from the pump 108 via solenoid 122 during normal operation and by hydraulic fluid 104 supplied to port 138D from the pump 108 via the manual valve 110 during a failure condition, as will be described in greater detail below. A biasing member 140, such as a spring, is disposed on an opposite side of the valve 132 and is operable to move the valve 132 to the first position when hydraulic fluid 104 is no longer communicated to port 138D.

Solenoid 114 is an electrically activated control device in electrical communication with the transmission controller 32 and operable to selectively allow fluid communication between a first fluid port 114A and a second fluid port 114B. In the example provided, the solenoid 114 is a normally high (i.e. open to allow fluid communication between port 114A and port 114B when not electrically activated), variable force solenoid. However, it should be appreciated that other types of solenoids and other control devices may be employed without departing from the scope of the present disclosure. Solenoid 114 is selectively activated to communicate pressurized hydraulic fluid 104 to the mode valve 112.

Solenoid 116 is an electrically activated control device in electrical communication with the transmission controller 32 and operable to selectively allow fluid communication between a first fluid port 116A and a second fluid port 116B. In the example provided, the solenoid 116 is a normally low (i.e. closed to prevent fluid communication between port 116A and port 116B when not electrically activated), variable force solenoid. However, it should be appreciated that other types of solenoids and other control devices may be employed without departing from the scope of the present disclosure. Solenoid 116 is selectively activated to communicate pressurized hydraulic fluid 104 to shift actuator 106D.

Solenoid 118 is an electrically activated control device in electrical communication with the transmission controller 32 and operable to selectively allow fluid communication between a first fluid port 118A and a second fluid port 118B. In the example provided, the solenoid 118 is a normally low (i.e. closed to prevent fluid communication between port 118A and port 118B when not electrically activated), variable force solenoid. However, it should be appreciated that other types of solenoids and other control devices may be employed without departing from the scope of the present disclosure. Solenoid 118 is selectively activated to communicate pressurized hydraulic fluid 104 to shift actuator 106E.

Solenoid 120 is an electrically activated control device in electrical communication with the transmission controller 32 and operable to selectively allow fluid communication between a first fluid port 120A and a second fluid port 120B. In the example provided, the solenoid 120 is a normally high (i.e. open to allow fluid communication between port 120A and port 120B when not electrically activated), variable force solenoid. However, it should be appreciated that other types of solenoids and other control devices may be employed without departing from the scope of the present disclosure. Solenoid 120 is selectively activated to communicate pressurized hydraulic fluid 104 to shift actuator 106F.

Solenoid 122 is an electrically activated control device in electrical communication with the transmission controller 32 and operable to selectively allow fluid communication between a first fluid port 122A and a second fluid port 122B. In the example provided, the solenoid 122 is a normally low (i.e. closed to prevent fluid communication between port 122A and port 122B when not electrically activated), on/off solenoid. However, it should be appreciated that other types of solenoids and other control devices may be employed without departing from the scope of the present disclosure. Solenoid 122 is selectively activated to communicate pressurized hydraulic fluid 104 to port 138D of the mode valve 112.

The hydraulic control system 100 also includes a first ball check valve 142 and a second ball check valve 144. The ball check valve 142 is disposed between the manual valve 110 and solenoids 116, 118, and 120. The ball check valve 142 is operable to prevent pressurized hydraulic fluid from communicating with solenoids 116 and 118 when the manual valve 112 is in the Reverse position. For example, the ball check valve 142 includes a first port 142A, a second port 142B, and a third port 142C. Port 142A is in communication with port 130A of the manual valve 112. Port 142B is in communication with solenoid 120. Port 142C is in communication with solenoids 116 and 118. The ball check valve 142 closes off whichever of the ports 142A, 142C that is delivering the lower hydraulic pressure and provides communication between whichever of the inlet ports 142A, 142C having or delivering the higher hydraulic pressure and port 142B. It should be appreciated that other types of valves and other control devices may be employed without departing from the scope of the present disclosure.

The ball check valve 144 is disposed between the manual valve 110, the mode valve 112, and solenoids 122. The ball check valve 144 is operable to prevent pressurized hydraulic fluid from communicating between the manual valve 110 and solenoid 122. For example, the ball check valve 144 includes a first port 144A, a second port 144B, and a third port 144C. Port 144A is in communication with port 130A of the manual valve 112. Port 144B is in communication with port 138D of the mode valve 112. Port 144C is in communication with solenoid 122. The ball check valve 144 closes off whichever of the ports 144A, 144C that is delivering the lower hydraulic pressure and provides communication between whichever of the inlet ports 144A, 144C having or delivering the higher hydraulic pressure and port 144B. It should be appreciated that other types of valves and other control devices may be employed without departing from the scope of the present disclosure.

The components of the hydraulic control system 100 are connected via a plurality of fluid communication lines. It should be appreciated that the fluid communication lines may be integrated in a valve body or formed from separate tubing or piping without departing from the scope of the present disclosure. In addition, the fluid communication lines may have any cross sectional shape and may include additional or fewer bends, turns, and branches than illustrated without departing from the scope of the present disclosure. In the example provided, a fluid communication line 150 connects the pump 108 with port 130B of the manual valve 110 and with port 114A of solenoid 114. A fluid communication line 152 connects port 130C of the manual valve 110 with port 142C of ball check valve 142, with port 116A of solenoid 116, and with port 118A of solenoid 118. A fluid communication line 154 connects port 130A of the manual valve 110 with port 142A of ball check valve 142 and with port 144A of ball check valve 144. A fluid communication line 156 connects port 142B of ball check valve 142 with port 120A of solenoid 120. A fluid communication line 158 connects port 114B of solenoid 114 with port 138B of the mode valve 112. A fluid restriction orifice 160 is disposed within line 158. A fluid communication line 162 connects port 138A of the mode valve 112 with shift actuator 106A. A fluid communication line 164 connects port 138C of the mode valve 112 with shift actuators 106B and 106C. A fluid communication line 166 connects port 138D of the mode valve 112 with port 144B of ball check valve 144. A fluid communication line 168 connects port 116B of solenoid 116 with shift actuator 106D. A fluid restriction orifice 170 is disposed within line 168. A fluid communication line 172 connects port 118B of solenoid 118 with shift actuator 106E. A fluid restriction orifice 174 is disposed within line 172. A fluid communication line 176 connects port 120B of solenoid 120 with shift actuator 106F. A fluid restriction orifice 178 is disposed within line 176. A fluid communication line 180 connects port 144C of ball check valve 144 with port 122B of solenoid 122. Finally, a fluid communication line 182 connects the pump 108 (via a pressure limiting valve, not shown) with port 122A of solenoid 122.

The operation of the hydraulic control system 100 will now be described. When an operator selects Drive, the manual valve 110 is moved to the Drive position, shown in FIG. 2. Hydraulic fluid 104 is communicated from the pump 108 through line 150 to port 130B of the manual valve 110. The hydraulic fluid 104 communicates through the manual valve 110 and out port 130C to line 152, from line 152 to solenoids 116 and 118 and to port 142C of ball check valve 142, from port 142C to port 142B, and from port 142B to solenoid 120. In addition, hydraulic fluid 104 is communicated from the pump 108 (via the pressure limiting valve, not shown) to line 182, and from line 182 to solenoid 122. In this condition, selective activation or deactivation of each of the solenoids 114, 116, 118, 120, and 122 allows for communication of pressurized hydraulic fluid 104 to the shift actuators 106A, 106D, 106E, and 106F, thereby allowing the transmission 10 to initiate second through sixth gears. To engage the first gear ratio, solenoid 122 is opened, thereby allowing hydraulic fluid 104 to communicate through line 180 to ball check valve 144, through ball check valve 144 to port 138D of the mode valve 112. The hydraulic fluid 104 contacts the valve 132 and moves the valve 132 to the second position. In this condition, hydraulic fluid communicated from solenoid 114 is directed from port 138B to port 138C and therefore to shift actuators 106B and 106C.

With reference to FIG. 3, in the event of an electrical or controller failure, it is desirable that the transmission 10 is able to still provide at least one forward speed ratio and a reverse speed ratio in order to allow the operator of the motor vehicle to drive to a repair facility. Accordingly, when all the solenoids 114, 116, 118, 120, and 122 are deenergized, solenoid 114 and solenoid 120 are open. When the manual valve is in the Drive position, hydraulic fluid 104 communicates through solenoid 114 to port 138B of the mode valve 112, from port 138B to port 138A, from port 138A to shift actuator 106A. In addition, hydraulic fluid 104 communicates through solenoid 120 via line 176 to shift actuator 106F. Accordingly, in the example provided, the transmission 10 is engaged in fifth forward gear when all the solenoids 114, 116, 118, 120, and 122 are deenergized.

Turning to FIG. 4, if the operator of the motor vehicle requires a Reverse speed ratio when all of the solenoids 114, 116, 118, 120, and 122 are deenergized, the manual valve 110 is moved to the Reverse position and hydraulic fluid 104 is communicated from the pump 108 via line 150 to port 130B of the manual valve 110 and to the solenoid 114. The hydraulic fluid 104 from port 130B of the manual valve 110 communicates to port 130A, from port 130A to line 154, from line 154 to port 142A of ball check valve 142 and to port 144A of ball check valve 144. The hydraulic fluid 104 from port 142A of ball check valve 142 communicates through the ball check valve 142 to port 142B, and from port 142B to line 156. The hydraulic fluid 104 from port 144A of ball check valve 144 is directed through ball check valve 144 to port 144B, from port 144B to port 138D of the mode valve 112. The hydraulic fluid 104 contacts valve 132 and moves the valve 132 to the second position. Accordingly, the hydraulic fluid 104 from solenoid 114 communicates through line 158 to port 138B, from port 138B to port 138C, and from port 138C to shift actuators 106B and 106C via line 164. In addition, the hydraulic fluid 104 from solenoid 120 is communicated to shift actuator 106F via line 176. Accordingly, in the example provided, the transmission 10 is engaged in a reverse speed ratio when all the solenoids 114, 116, 118, 120, and 122 are deenergized.

Figure 5:
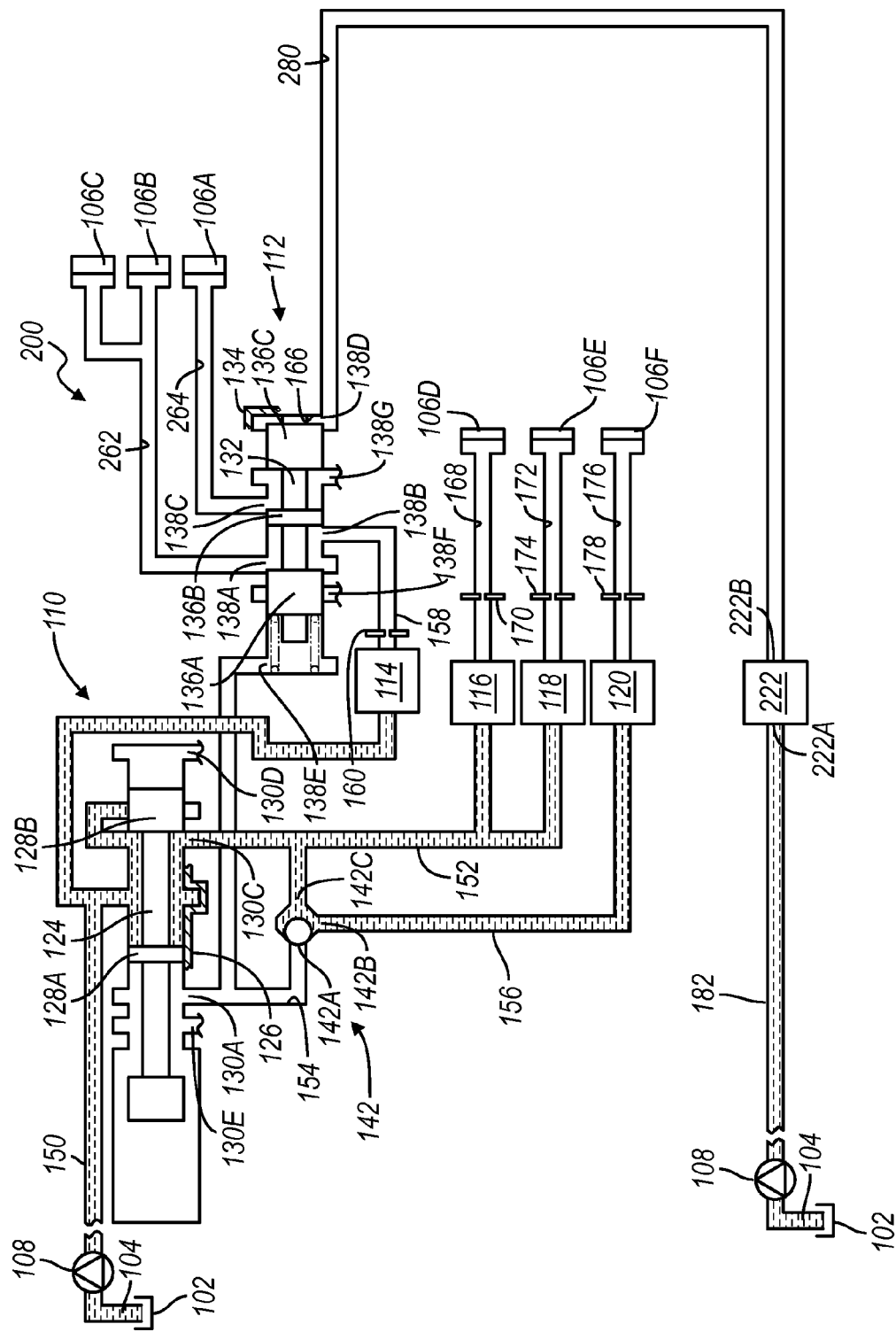
FIG. 5 is a schematic diagram of another embodiment of a hydraulic control system for an automatic transmission according to the principles of the present disclosure.

Turning now to FIG. 5, another embodiment of a hydraulic control system according to the principles of the present disclosure is generally indicated by reference number 200. The hydraulic control system 200 is similar to the hydraulic control system 100 and therefore like components are indicated by like reference numbers. However, in the hydraulic control system 200, the ball check valve 144 has been removed, solenoid 122 has been replaced with a new solenoid 222, and fluid communication lines 154, 162, 164, and 180 have been replaced with alternate connections, as will be described in greater detail below.

Solenoid 222 is an electrically activated control device in electrical communication with the transmission controller 32 and operable to selectively allow fluid communication between a first fluid port 222A and a second fluid port 222B. In the example provided, the solenoid 222 is a normally high (i.e. open to allow fluid communication between port 222A and port 222B when not electrically activated), on/off solenoid. However, it should be appreciated that other types of solenoids and other control devices may be employed without departing from the scope of the present disclosure. Solenoid 222 is selectively activated to communicate pressurized hydraulic fluid 104 from the pump 108 directly to the mode valve 112.

The hydraulic control system 200 includes a fluid communication line 254 that connects port 130A of the manual valve 110 with port 142A of ball check valve 142 and with port 138E of the mode valve 112. A fluid communication line 262 connects port 138A of the mode valve 112 with shift actuators 106C and 106B. A fluid communication line 264 connects port 138C of the mode valve 112 with shift actuator 106A. Finally, a fluid communication line 280 connects port 222A of the solenoid 222 with port 138D of the mode valve 112.

The operation of the hydraulic control system 200 will now be described. When an operator selects Drive, the manual valve 110 is moved to the Drive position, shown in FIG. 5. Hydraulic fluid 104 is communicated from the pump 108 through line 150 to port 130B of the manual valve 110. The hydraulic fluid 104 communicates through the manual valve 110 and out port 130C to line 152, from line 152 to solenoids 116 and 118 and to port 142C of ball check valve 142, from port 142C to port 142B, and from port 142B to solenoid 120. In addition, hydraulic fluid 104 is communicated from the pump 108 (via the pressure limiting valve, not shown) to line 182, and from line 182 to solenoid 222. The biasing member 140 moves the mode valve 112 to the first position. In this condition, selective activation or deactivation of each of the solenoids 114, 118, 120 allows for communication of pressurized hydraulic fluid 104 to the shift actuators 106B, 106C, 106E, and 106F, thereby allowing the transmission 10 to initiate reverse and first gear ratios. To engage the second through sixth gear ratios, solenoid 222 is opened, thereby allowing hydraulic fluid 104 to communicate through line 280 to port 138D of the mode valve 112. The hydraulic fluid 104 contacts the valve 132 and moves the valve 132 to the second position. In this condition, hydraulic fluid communicated from solenoid 114 is directed from port 138B to port 138C and therefore to shift actuator 106A.

Reverse is engaged when the manual valve 110 is moved to the Reverse position. Hydraulic fluid 104 is directed through the manual valve 112 to port 130A, from port 130A through line 254 to port 138E and to port 142A of the ball check valve 142. The hydraulic fluid 104, as well as the biasing member 140, keeps the mode valve 112 in the first position, thereby directing hydraulic fluid from solenoid 114 to the shift actuators 106C and 106B.

In the event of an electrical or controller failure, it is desirable that the transmission 10 is able to still provide at least one forward speed ratio and a reverse speed ratio in order to allow the operator of the motor vehicle to drive to a repair facility. Accordingly, when all the solenoids 114, 116, 118, 120, and 222 are deenergized, solenoid 114, 120, and solenoid 220 are open. When the manual valve is in the Drive position, hydraulic fluid 104 communicates through solenoid 222 and contacts the mode valve 112, thereby moving the mode valve 112 to the second position. Therefore, hydraulic fluid 104 communicates through solenoid 114 to port 138B of the mode valve 112, from port 138B to port 138C, from port 138C to shift actuator 106A. In addition, hydraulic fluid 104 communicates through solenoid 120 via line 176 to shift actuator 106F Accordingly, in the example provided, the transmission 10 is engaged in fifth forward gear when all the solenoids 114, 116, 118, 120, and 222 are deenergized.

If the operator of the motor vehicle requires a Reverse speed ratio when all of the solenoids 114, 116, 118, 120, and 222 are deenergized, the manual valve 110 is moved to the Reverse position and hydraulic fluid 104 is communicated from the pump 108 via line 150 to port 130B of the manual valve 110 to port 130A, and from port 130A to port 138E of the mode valve 112. The hydraulic fluid 104 contacts the valve 132 and the force exerted on the valve 132 by the hydraulic fluid 104 from the manual valve 110 and by the biasing member 140 is sufficient to overcome the force exerted on the valve 132 by the hydraulic fluid 104 from the solenoid 222. Accordingly, the mode valve 112 moves to the first position. Therefore, hydraulic fluid 104 communicates through solenoid 114 to port 138B of the mode valve 112, from port 138B to port 138A, from port 138A to shift actuators 106B and 106C. In addition, hydraulic fluid 104 communicates through solenoid 120 via line 176 to shift actuator 106F. Accordingly, in the example provided, the transmission 10 is engaged in a reverse speed ratio when all the solenoids 114, 116, 118, 120, and 222 are deenergized.

Figure 6:
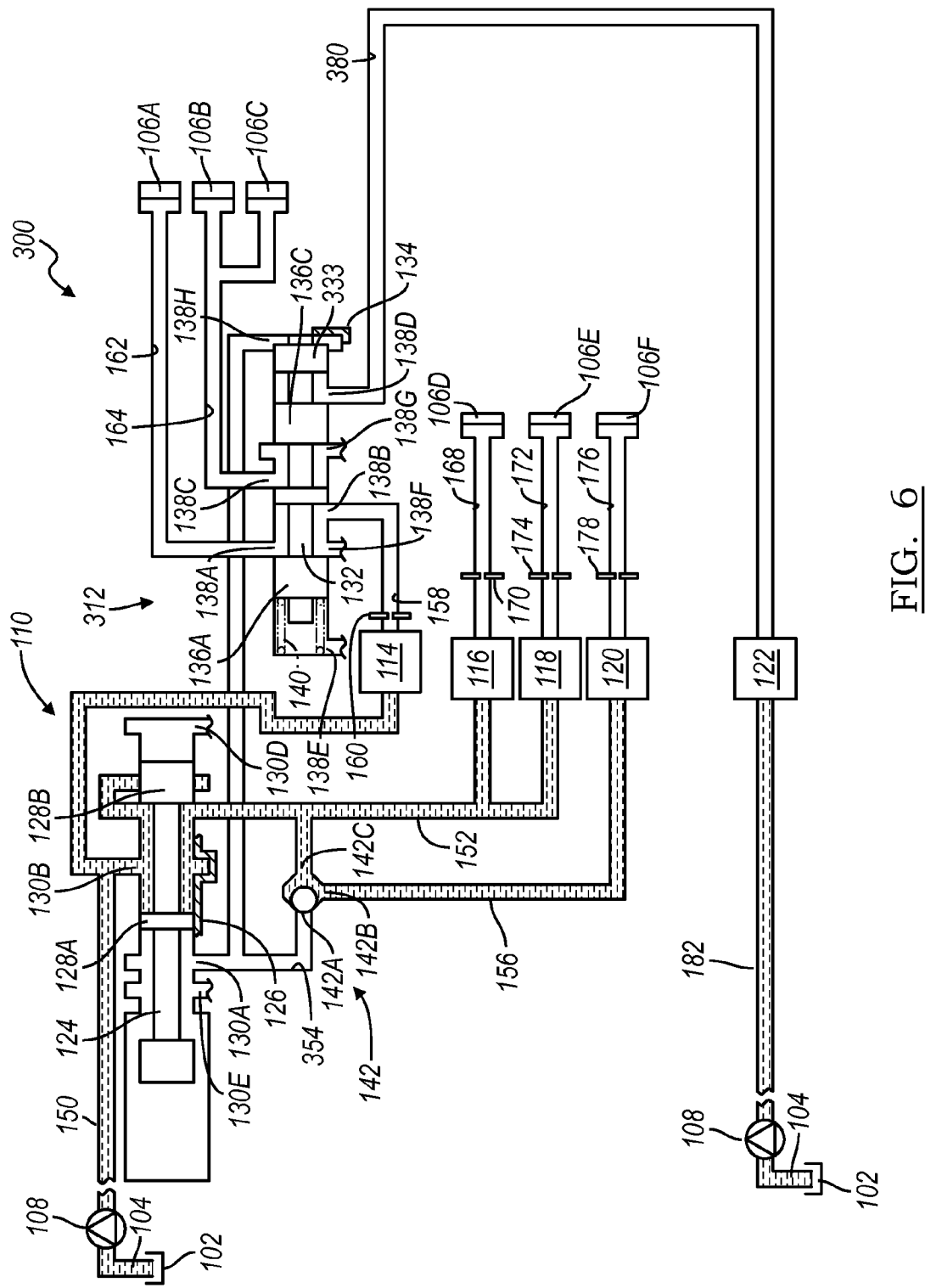
FIG. 6 is a schematic diagram of yet another embodiment of a hydraulic control system for an automatic transmission according to the principles of the present disclosure.

Turning now to FIG. 6, another embodiment of a hydraulic control system according to the principles of the present disclosure is generally indicated by reference number 300. The hydraulic control system 300 is similar to the hydraulic control system 100 and therefore like components are indicated by like reference numbers. However, in the hydraulic control system 300, the ball check valve 144 has been removed, mode valve 112 has been replaced with a two-way mode valve 312, and fluid communication lines 154 and 180 have been replaced with alternate connections, as will be described in greater detail below.

The two-way mode valve 312 is similar to the mode valve 112 but includes a second valve 333 and an additional port 138H. The second valve 333 is located at an end of valve 132 between port 138D and port 138H. Port 138H is located at the end of the mode valve 312.

A fluid communication line 354 connects port 130A of the manual valve 110 with port 138H of the mode valve 312. A fluid communication line 380 connects port 138D of the mode valve 312 with port 122B of solenoid 122.

The operation of the hydraulic control system 300 will now be described. When an operator selects Drive, the manual valve 110 is moved to the Drive position, shown in FIG. 5. Hydraulic fluid 104 is communicated from the pump 108 through line 150 to port 130B of the manual valve 110. The hydraulic fluid 104 communicates through the manual valve 110 and out port 130C to line 152, from line 152 to solenoids 116 and 118 and to port 142C of ball check valve 142, from port 142C to port 142B, and from port 142B to solenoid 120. In addition, hydraulic fluid 104 is communicated from the pump 108 (via the pressure limiting valve, not shown) to line 182, and from line 182 to solenoid 122. The biasing member 140 moves the mode valve 112 to the first position. In this condition, selective activation or deactivation of each of the solenoids 114, 116, 118, 120 allows for communication of pressurized hydraulic fluid 104 to the shift actuators 106A, 106D, 106E, and 106F, thereby allowing the transmission 10 to initiate second through sixth gear ratios. To engage the first gear ratio, solenoid 122 is opened, thereby allowing hydraulic fluid 104 to communicate through line 380 to port 138D of the mode valve 112. The hydraulic fluid 104 contacts the valve 132 and moves the valve 132 to the second position. In this condition, hydraulic fluid communicated from solenoid 114 is directed from port 138B to port 138C and therefore to shift actuators 106B and 106C.

Reverse is engaged when the manual valve 110 is moved to the Reverse position. Hydraulic fluid 104 is directed through the manual valve 112 to port 130A, from port 130A through line 354 to port 138H and to port 142A of the ball check valve 142. The hydraulic fluid 104 from port 138H contacts the second valve 333 which moves the valve 132 to the second position, thereby directing hydraulic fluid from solenoid 114 to the shift actuators 106C and 106B.

In the event of an electrical or controller failure, it is desirable that the transmission 10 is able to still provide at least one forward speed ratio and a reverse speed ratio in order to allow the operator of the motor vehicle to drive to a repair facility. Accordingly, when all the solenoids 114, 116, 118, 120, and 122 are deenergized, solenoid 114 and 120 are open. When the manual valve is in the Drive position, the mode valve 112 is in the first position due to the biasing member 140, and hydraulic fluid 104 communicates through solenoid 114 to port 138B of the mode valve 112, from port 138B to port 138A, from port 138A to shift actuator 106A. In addition, hydraulic fluid 104 communicates through solenoid 120 via line 176 to shift actuator 106F. Accordingly, in the example provided, the transmission 10 is engaged in fifth forward gear when all the solenoids 114, 116, 118, 120, and 122 are deenergized.

If the operator of the motor vehicle requires a Reverse speed ratio when all of the solenoids 114, 116, 118, 120, and 122 are deenergized, the manual valve 110 is moved to the Reverse position and hydraulic fluid 104 is communicated from the pump 108 via line 150 to port 130B of the manual valve 110 to port 130A, and from port 130A to port 138H of the mode valve 112. The hydraulic fluid 104 contacts the second valve 333 which contacts and moves the valve 132 to the second position. Therefore, hydraulic fluid 104 communicates through solenoid 114 to port 138B of the mode valve 112, from port 138B to port 138A, from port 138C to shift actuators 106B and 106C. In addition, hydraulic fluid 104 communicates through solenoid 120 via line 176 to shift actuator 106F. Accordingly, in the example provided, the transmission 10 is engaged in a reverse speed ratio when all the solenoids 114, 116, 118, 120, and 122 are deenergized.

Figure 7:
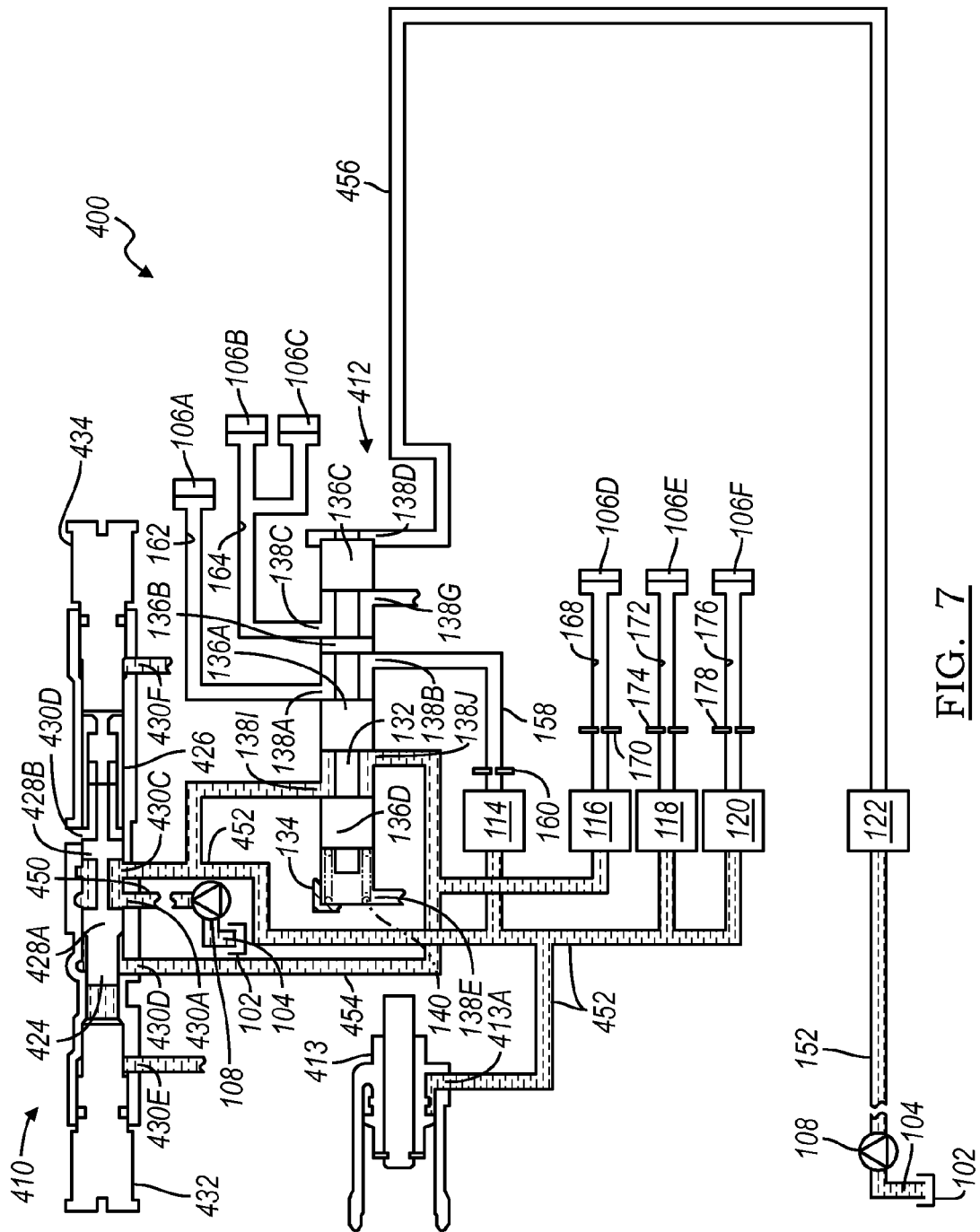
FIG. 7 is a schematic diagram of yet another embodiment of a hydraulic control system for an automatic transmission in a first mode of operation according to the principles of the present disclosure.
Figure 8:
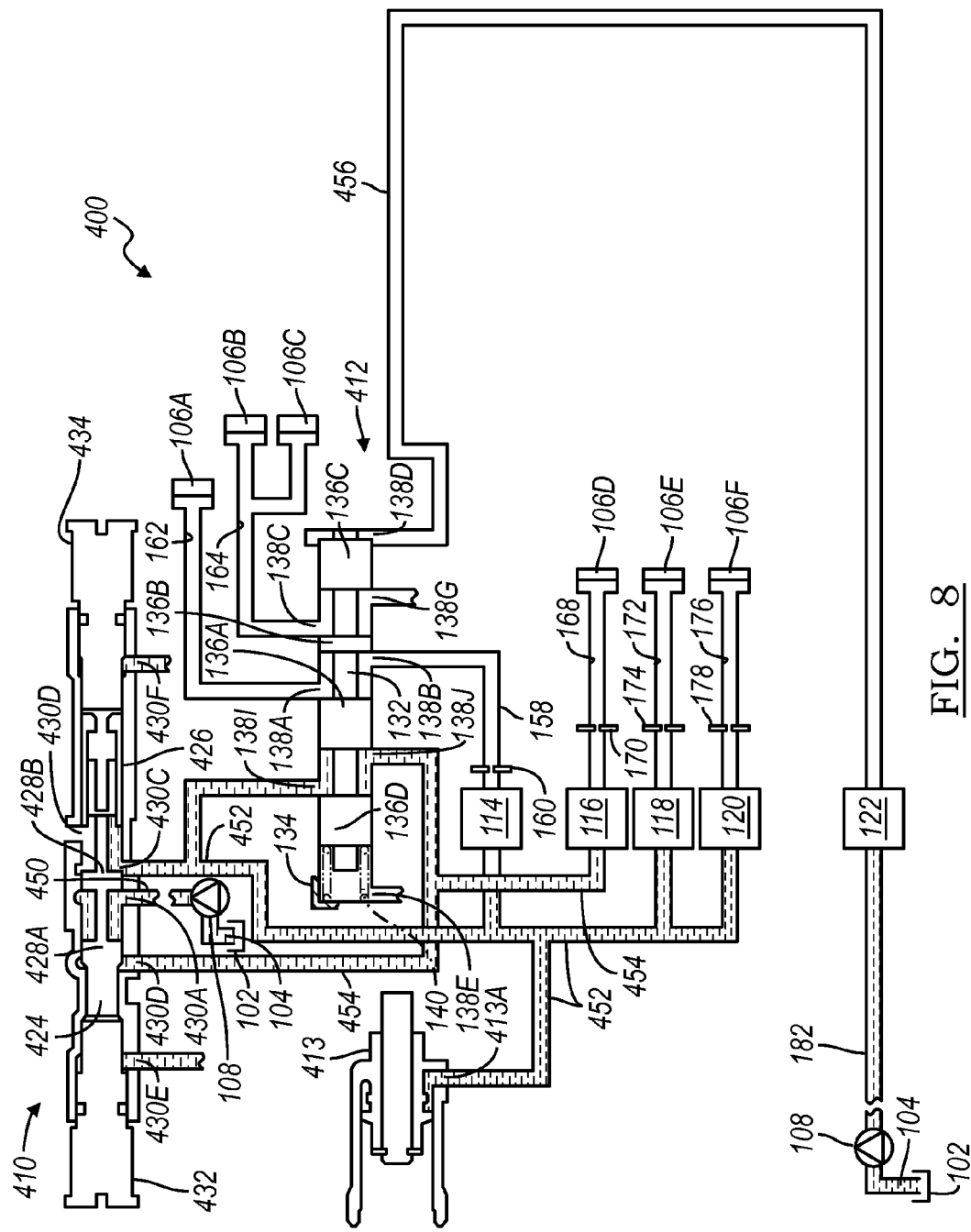
FIG. 8 is a schematic diagram of yet another embodiment of a hydraulic control system for an automatic transmission in a second mode of operation according to the principles of the present disclosure.

Turning to FIGS. 7 and 8, another embodiment of a hydraulic control system is indicated by reference number 400. The hydraulic control system 400 is similar to the hydraulic control system 100 and therefore like components are indicated by like reference numbers. However, in the hydraulic control system 400, the manual valve 110 has been replaced by an electronic range selection (ETRS) valve 410, the mode valve 112 has been replaced with an alternate mode valve 412, a park release servo 413 has been added, the ball check valves 142 and 144 have been removed, and various fluid communication lines have been replaced with alternate connections, as will be described in greater detail below.

The ETRS valve 410 is operable to provide at least two modes of transmission operation including a first mode or out-of-Park mode and a second mode or Park mode. While in Park mode, the transmission is prevented from moving the vehicle by preferably locking an output shaft (not shown) of the transmission. While in out-of-Park mode, the transmission may move the vehicle by engaging any of the forward or reverse speed ratios. The ETRS valve 410 generally includes a valve 424 slidably disposed within a valve body 426. The valve 424 is a spool valve having a plurality of lands 428A and 428B. A plurality of ports are disposed in the valve body 426 and communicate with the valve 424. For example, the ETRS valve 424 includes port 430A, port 430B, port 430C, port 430D, port 430E, and port 430F. Ports 430 E and 430F are ports that connect with the source of pressurized hydraulic fluid 108 through a pressure regulating valve (not shown) and port 430D is an exhaust port. It should be appreciated that the ETRS valve 410 may have various other ports and configurations without departing from the scope of the present disclosure.

The valve 424 is moveable between a plurality of positions that correspond to an out-of-Park mode of operation and a Park or neutral mode of operation. When the valve 424 is in the out-of-Park position, shown in FIG. 7, port 430A communicates with port 430C. When the valve 424 is in the neutral position, port 430A is prevented from communicating with port 430C by land 428B. The valve 424 is moved to the out-of-Park position by an out-of-Park solenoid 432 and is moved to the neutral position by a return-to-park solenoid 434. In a preferred embodiment, the return-to-Park solenoid 434 is a normally open solenoid that allows communication of the hydraulic fluid 104 from port 430F to the ETRS valve 410 when the return-to-Park solenoid 434 is deenergized. Also in a preferred embodiment, the out-of-Park solenoid 432 is a normally closed solenoid that prevents communication of the hydraulic fluid 104 from port 430E to the ETRS valve 410 when the out-of-Park solenoid 432 is deenergized.

The two-way mode valve 412 is similar to the mode valve 112 but the valve 132 includes an additional land 136D and the valve body 134 includes additional ports 138I and 138J. The land 136D allows communication between port 138I and 138J when the valve 132 is in the first position and the land 136D prevents communication between port 138I and port 138J when the valve 132 is in the second position.

The park release servo 413 is operable to translate hydraulic fluid pressure into mechanical movement or translation of a park release actuator (not shown) in order to places the transmission 10 in the out-of-Park mode of operation. The park release servo 413 includes a fluid port 413A.

A fluid communication line 450 connects 454 connects the pump 108 with port 430A of the ETRS valve 410. A fluid communication line 452 connects port 430C of the ETRS valve 410 with port 413A of the park release servo 413, with port 138I of the mode valve 412, and with solenoids 114, 118, and 120. A fluid communication line 454 connects port 430B of the ETRS valve 410 with port 138J of the mode valve 412 and with solenoid 116. Finally, a fluid communication line 456 connects solenoid 122 with port 138D of the mode valve 412.

The operation of the hydraulic control system 400 will now be described. When an operator selects Drive, the ETRS valve 410 is moved to the out-of-Park position by activation of the out-of-Park solenoid 432 by the controller 32. Hydraulic fluid 104 is communicated from the pump 108 through line 450 to port 430A of the ETRS valve 410. The hydraulic fluid 104 communicates through the ETRS valve 410 and out port 430C. The hydraulic fluid communicates from port 430C through line 452 to solenoids 114, 118, 120, the park release servo 413, and port 138I of the mode valve 412. The hydraulic fluid 104 engages the park release servo 413 and places the transmission 10 in an out-of-Park mode of operation. The hydraulic fluid 104 from port 138I of the mode valve 412 communicates through the mode valve to port 138J, and from port 138J to line 454, and from line 454 to solenoid 116 and port 430B of the ETRS valve 410. In addition, hydraulic fluid 104 is communicated from the pump 108 (via the pressure limiting valve, not shown) to line 182, and from line 182 to solenoid 122. The biasing member 140 positions the mode valve 412 to the first position. In this condition, selective activation or deactivation of each of the solenoids 114, 116, 118, 120 allows for communication of pressurized hydraulic fluid 104 to the shift actuators 106A, 106D, 106E, and 106F, thereby allowing the transmission 10 to initiate second through sixth gear ratios. To engage the first gear ratio, solenoid 122 is opened, thereby allowing hydraulic fluid 104 to communicate through line 458 to port 138D of the mode valve 412. The hydraulic fluid 104 contacts the valve 432 and moves the valve 432 to the second position. In this condition, hydraulic fluid 104 communicated from solenoid 114 is directed from port 138B to port 138C and therefore to shift actuators 106B and 106C and hydraulic fluid 104 is prevented from communicating from port 138I to port 138J.

In the event of an electrical or controller failure, all the solenoids 114, 116, 118, 120, and 122 as well as the return-to-Park solenoid 434 and the out-of-Park solenoid 432 are deenergized and solenoids 114, 120, and 434 are open and the ETRS valve 410 moves to the neutral position. In addition, the mode valve 412 moves to the first position by the biasing member 140. In this condition, fluid communication lines 452 and 454 communicate with port 430D of the ETRS valve 410 and therefore exhaust.

The description of the disclosure is merely exemplary in nature and variations that do not depart from the general essence of the disclosure are intended to be within the scope of the disclosure. Such variations are not to be regarded as a departure from the spirit and scope of the disclosure.

We claim the following:

1. A hydraulic control system for actuating a plurality of torque transmitting devices in a transmission, the hydraulic control system comprising:
   a pump for providing a hydraulic fluid;
   first, second, third, fourth, fifth, and sixth actuators for selectively actuating the plurality of torque transmitting devices;
   first, second, third, and fourth control devices, wherein the first control device is in communication with the pump, the second control device is in communication with the third actuator, the third control device is in communication with the fourth actuator, and the fourth control device is in communication with the sixth actuator;
   a first valve in communication with the pump and with the second, third, and fourth control devices, wherein the first valve is moveable between a drive position and a reverse position,
   a second valve in communication with the first valve, the first control device, the first actuator, the second actuator, and the third actuator, wherein the second valve is moveable between a first position and a second position, and
   wherein the first valve allows communication between the pump and the second, third, and fourth control devices when the first valve is in the drive position, and wherein the first valve allows communication between the pump and the first and fourth control devices and the second valve when the first valve is in the reverse position, and
   wherein the second valve allows communication between the first control device and the first actuator when the second valve is in the first position, and wherein the second valve allows communication between the first control device and the second and third actuators when the second valve is in the second position,
   and wherein the first and fourth control devices are configured to, allow hydraulic fluid to pass through the first and fourth control devices to engage at least one forward gear state and a reverse gear state when the first and fourth control devices are not activated.

2. The hydraulic control system of claim 1 wherein the sixth actuator is operable in combination with at least one of the first, second, and third actuators to engage a forward speed ratio and a reverse speed, ratio.

3. The hydraulic control system of claim 2 wherein the sixth actuator and the first actuator are engageable, in combination, to provide a forward gear ratio and the sixth actuator and the second and third actuators are engageable, in combination, to provide a reverse gear ratio.

4. The hydraulic control system of claim 3 wherein the hydraulic fluid communicated from the first valve to the second valve when the first valve is in the Reverse position moves the second valve to the second position.

5. The hydraulic control system of claim 3 further comprising a fifth control device in communication with the pump and with the second valve, wherein the fifth control device is operable to allow hydraulic fluid to communicate through the fifth control device to the second valve when the fifth control device is not activated, and wherein the hydraulic fluid from the fifth control device contacts the second valve and moves the second valve to the first position.

6. The hydraulic control system of claim 5 wherein the second valve includes a first port located at one end of the second valve and includes a second port located at an opposite end of the second valve and wherein the first port communicates with the first valve and the second port communicates with the fifth control device.

7. The hydraulic control system of claim 6 wherein the hydraulic fluid from the first valve contacts the second valve and moves the second valve to the second position when the first valve is in the reverse position.

8. The hydraulic control system of claim 7 wherein the fifth control device is a solenoid that allows the hydraulic fluid to communicate from the pump to the second valve when the solenoid is deenergized.

9. The hydraulic control system of claim 7 wherein the fifth control device is a solenoid that does not allow the hydraulic fluid to communicate from the pump to the second valve when the solenoid is deenergized.

10. The hydraulic control system of claim 3 further comprising a fifth control device in communication with the pump and with the second valve, wherein the fifth control device is operable to allow hydraulic fluid to communicate through the fifth control device to the second valve when the fifth control device is activated, and wherein the hydraulic fluid from the fifth control device contacts the second valve and moves the second valve to the second position.

11. The hydraulic control system of claim 10 wherein the second valve is a two piece valve having a first valve part and a second valve part, and wherein the manual valve communicates with the second valve at an end of the second part and the fifth control device communicates with the second valve between the first valve part and the second valve part.

12. The hydraulic control system of claim 11 wherein the second valve includes a biasing member in contact with the first valve part, the biasing member operable to bias the first valve part to the first position.

13. The hydraulic control system of claim 6 wherein the hydraulic fluid from the first valve contacts the second valve part and moves the first valve part to the second position when the first valve is in the Reverse position.

14. The hydraulic control system of claim 3 wherein the first valve is actuated to the first position by a first solenoid and is actuated to the second position by a second solenoid.

15. The hydraulic control system of claim 14 further comprising a park release servo in communication with the first valve and operable to place the transmission in an out-of-park mode of operation.

16. The hydraulic control system of claim 1 wherein the first and fourth control devices are solenoids that are open when deenergized and the second and third control devices are solenoids that are closed when deenergized.

17. A hydraulic control system for actuating a plurality of torque transmitting devices in a transmission, the hydraulic control system comprising:
   a pump for providing a hydraulic fluid;
   first, second, third, fourth, fifth, and sixth actuators for selectively actuating the plurality of torque transmitting devices;
   first, second, third, fourth, and fifth control devices, wherein the first control device is in communication with the pump, the second control device is in communication with the third actuator, the third control device is in communication with the fourth actuator, the fourth control device is in communication with the sixth actuator, and the fifth control device is in communication with the pump;
   a first valve having a first port in communication with the pump, a second port, and a third port in communication with the second and third control devices, wherein the first valve is moveable between a drive position and a reverse position,
   a second valve having a first port in communication with the first control device, a second port in communication with the first actuator, a third port in communication with the second and third actuators, and a fifth port, wherein the second valve is moveable between a first position and a second position;
   a first check valve having a first port in communication with the second port of the first valve, a second port in communication with the fourth control device, and a third port in communication with the third port of the first valve, wherein the first check valve is operable to selectively allow communication between the first port of the first check valve and the second port of the first check valve and between the third port of the first check valve and the second port of the first check valve;
   a second check valve having a first port in communication with the second port of the first valve, a second port in communication with the fourth port of the second valve, and a third port in communication with the fifth control device, wherein the first check valve is operable to selectively allow communication between the first port of the second check valve and the second port of the second check valve and between the third port of the second check valve and the second port of the second check valve;
   wherein the first valve allows communication between the first port of the first valve and the third port of the first valve when the first valve is in the drive position, and wherein the first valve allows communication between the first port of the first valve and the second port of the first valve when the first valve is in the reverse position, and
   wherein the second valve allows communication between the first port of the second valve and the second port of the second valve when the second valve is in the first position, and wherein the second valve allows communication between the first port of the second valve and the third port of the second valve when the second valve is in the second position,
   and wherein the first and fourth control devices are configured to allow hydraulic fluid to pass through the first and fourth control devices to engage at least one forward gear state and a reverse gear state when the first and fourth control devices are not activated.

18. The hydraulic control system of claim 17 wherein the sixth actuator is operable to engage in combination with at least one of the first, second, and third actuators a forward speed ratio and a reverse speed ratio.

19. The hydraulic control system of claim 18 wherein the sixth actuator and the first actuator are engageable, in combination, to provide a forward gear ratio and the sixth actuator and the second and third actuators are engageable, in combination, to provide a reverse gear ratio.

20. The hydraulic control system of claim 19 wherein the hydraulic fluid communicated from the first valve to the second valve when the first valve is in the Reverse position moves the second valve to the second position.

21. The hydraulic control system of claim 17 wherein the first and fourth control devices are solenoids that are open when deenergized and the second, third, and fifth control devices are solenoids that are closed when deenergized.

* * * * *